May 3, 1960  R. L. DEGA  2,935,365
SEAL
Filed Jan. 2, 1958
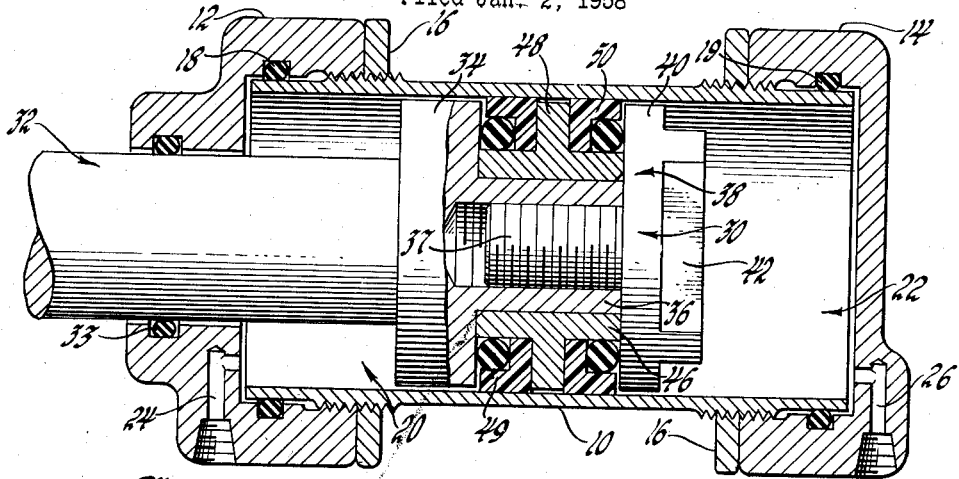
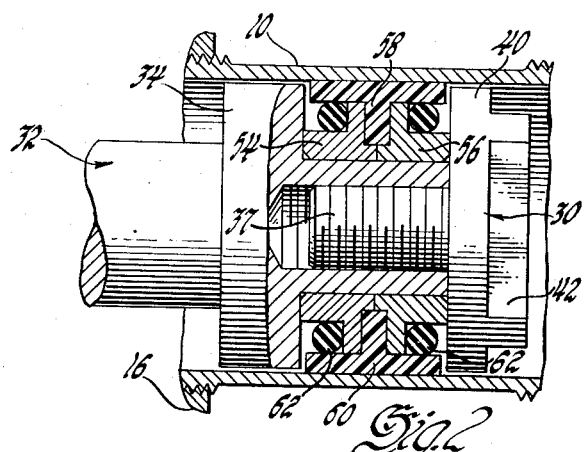
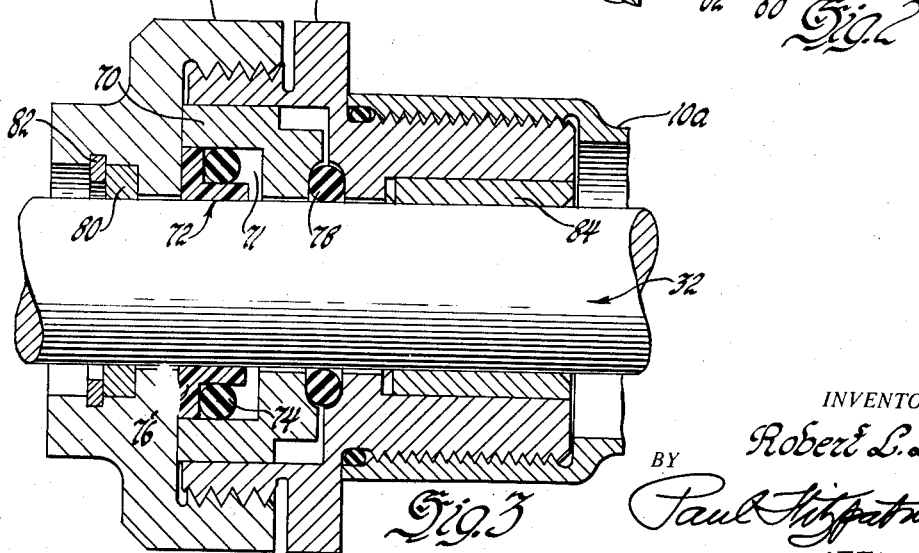
INVENTOR.
Robert L. Dega
BY Paul Fitzpatrick
ATTORNEY

United States Patent Office 2,935,365
Patented May 3, 1960

2,935,365

SEAL

Robert L. Dega, Utica, Mich., assignor to General Motors Corporation, Detroit, Mich., a corporation of Delaware Application January 2, 1958, Serial No. 706,776

4 Claims. (Cl. 309—23)

This invention relates to fluid seals between relatively movable members and in its most specific aspect concerns fluid seals between relatively reciprocal members, e.g., pistons and cylinders, piston shafts and cylinder heads, etc.

As its principal object, the invention aims to provide a fluid seal effective over a wide range of pressures and temperatures.

A further object is to provide a seal construction in which polytetrafluoroethylene resin, a plastic commonly identified by the trade name "Teflon," may be used with advantage.

A seal construction according to the invention is characterized inter alia in that it comprises an adapter spool or ring whereby on installation of the seal the polytetrafluoroethylene or similar component may be properly located without any substantial amount of distortion or stretching thereof. In prior seals employing polytetrafluoroethylene materials, it has been found that assembly procedures involving such distortion or stretching lead to serious leakage problems at low fluid pressures. This condition obtains because the polytetrafluoroethylene material unlike synthetic elastomers as neoprene, for example, becomes restored to its initial shape after distortion or stretching only very slowly, if ever.

The invention will be specifically described in terms of preferred embodiments thereof illustrated by the accompanying drawings in which—

Figure 1 is a view partly in section and partly in elevation of a power cylinder in which the piston sealing means conforms to the invention;

Figure 2 illustrates a modification; and

Figure 3 shows a piston shaft seal construction according with the invention.

Referring first to Figure 1, the illustrated assembly will be seen as including a cylinder 10 carrying heads 12 and 14 threadingly secured to the cylinder. Lock rings 16 operate to prevent loosening of the threaded connections, while O-ring seals 18, 19 prevent escape of fluid from the chambers 20 and 22, respectively.

Fluid is admitted to and withdrawn from the chamber 20 via a passage 24. A passage 26 serves similarly with respect to chamber 22.

Within the cylinder 10 is a piston 30 having a shaft 32 extending through the head 12, the latter being recessed for the accommodation of an O-ring 33. As shown, the piston shaft 32 terminates in a flange 34 having a boss portion 36. This boss portion is internally threaded to receive the screw portion 37 of a member 38, the flanged head 40 of which is of the same diameter as the flange 34. Member 38 is recessed at 42 for the accommodation of a suitable tool facilitating the making of the screw connection.

Disposed between the flanges 34 and 40 and surrounding the boss 36, is an adapter spool or ring 46 having a rib 48 delineating a pair of annular recesses with the inner walls of the flanges. Within each such recess is a composite seal including an inner O-ring component 49 and an outer component 50, also circumferentially continuous, constituted of polytetrafluoroethylene or other material of similar properties. The latter component is advantageously formed, as shown, so as to be L-shaped in cross section, thereby to provide a pocket or cup for the O-ring.

With the arrangement as described and illustrated, it should be apparent that the assembling of the piston involves no distortion of the polytetrafluoroethylene material. Thus, it is only necessary to slip the adapter with the two seals thereon over the boss 36 and then apply the flanged screw 30. If desired, the dimensioning of the several parts may be such that the clearance shown in the drawings between the inner wall of each flange 34, 40 and the near wall of the corresponding seal 50 may be largely taken up. Some installations may demand this to the end of avoiding feathering at the edge of the component 50.

All O-rings herein contemplated are desirably formed of neoprene, or similar oil resistant elastomer, where the working fluid is a mineral oil. O-rings comprising natural rubber may be employed, of course, in connection with pneumatic systems.

Going now to Figure 2 in which like numerals are used to denote like parts in Figure 1, in this case it will be seen that a pair of adapters 54, 56 are employed and that the two adapters conjointly provide an annular recess for the accommodation of the rib portion 58 of the polytetrafluoroethylene seal component 60. It will be further observed that the pockets for the two O-rings 62 are provided by the adapter members in conjunction with the under-surface of the polytetrafluoroethylene component.

In Figure 3, illustrating the invention as applied in the sealing of a piston shaft 32, the construction comprises a pair of flanged members 66 and 68 threadingly connected to contain adapter 70. Such adapter is formed to provide a pocket 71 which, with the inner wall of the flanged member 66, yields an annular recess for the accommodation of the composite seal 72 made up of an O-ring 74 and a polytetrafluoroethylene component 76, formed to an L-shape cross section just as the annulus 50 in Figure 1.

An O-ring 78, rightward of the composite seal, is confined within a pocket provided by the adapter 70 and the flanged member 68. This O-ring functions as a static seal, i.e., it prevents loss of fluid when the shaft 32 is not reciprocating. At installation, such O-ring is compressed in a direction tending to produce elongation of the diameter of the O-ring material, taken vertically, thereby giving an excessive amount of "shaft squeeze," initially. In operation of the piston shaft, the fluid pressure deriving from the cylinder 10a normally forces the O-ring 78 radially away from the piston shaft, but under static conditions when the fluid pressure approaches atmospheric pressure, the ring will again contact the shaft, effecting a seal.

Leftward of the composite seal 72 (Fig. 3) flanged member 66 is formed to provide a shoulder abutted by a wiper ring 80 held in place by a snap ring 82 accommodated in a groove in the member 66.

A bearing 84, in which the shaft 32 moves, is suitably secured in an annular recess in the flanged member 68, which threadingly connects with cylinder 10a, previously mentioned.

In the instance of each of the composite seals shown in the drawings, it should be understood that on reciprocation of the piston, or the shaft in the case of Figure 3, the pressure fluid entering the recess or pocket formed by the adapter (48, 54, 56 or 70) causes distortion of the corresponding O-ring. The radially-acting force thus developed in the O-ring is applied expansively against the polytetrafluoroethylene component assuring effective sealing engagement thereof against the cylinder wall or the piston rod, as the case may be.

The invention claimed is:

1. A piston and cylinder assembly in which the piston comprises a pair of flanged members interconnected to form an annular space between the flanges, there being disposed in such space and surrounding the means through which said members are interconnected adapter means providing an annular recess and a pair of pockets, one at either side of said recess, and a composite seal comprising a pair of fluid pressure-distortible components accommodated in said pockets, each having the form of a circumferentially continuous ring, and a third component, also circumferentially continuous, formed of polytetrafluoroethylene resin, said third component surrounding said fluid pressure-distortible components and having an inwardly projecting rib accommodated in said recess.

2. A device for preventing escape of fluid between relatively moving parts having slidably fitted complementary working surfaces, said device comprising means providing an annular recess in one of said surfaces, adapter means accommodated in said recess and itself providing an annular recess and a pocket at one side of said last recess, and a composite seal including a fluid pressure-distortible, circumferentially continuous component accommodated in said pocket, and a second component also circumferentially continuous substantially closing said pocket and having an inwardly projecting rib accommodated in said last recess, said second component being formed of a plastic material possessing low friction characteristics with high resistance to abrasion but little restorative capacity following distortion or stretching.

3. A device for preventing escape of fluid between relatively moving parts having slidably fitted complementary working surfaces, said device comprising means providing an annular recess in one of said surfaces, adapter means accommodated in said recess and providing an annular recess and a pair of pockets one at either side of said last recess, and a composite seal including a pair of fluid pressure-distortible components accommodated in said pockets, each of said components having the form of a circumferentially continuous ring, and a third component also circumferentially continuous substantially closing said pockets and having an inwardly projecting rib accommodated in said last recess, said third component being formed of a plastic material possessing low friction characteristics with high resistance to abrasion but little restorative capacity following distortion or stretching.

4. A piston and cylinder assembly in which the piston comprises a pair of flanged members interconnected to form an annular space between the flanges, there being disposed in such space and surrounding the means through which said members are interconnected a pair of adapter rings in abutting relation providing an annular recess and a pair of pockets one at either side of said recess, and a composite seal including a pair of fluid pressure-distortible components accommodated in said pockets, each having the form of a circumferentially continuous ring, and a third component also circumferentially continuous formed of polytetrafluoroethylene resin, said third component surrounding said fluid pressure-distortible components and having an inwardly projecting rib accommodated in said recess.

References Cited in the file of this patent
UNITED STATES PATENTS

| | | |
|---|---|---|
| 2,420,718 | Odelius | May 20, 1947 |
| 2,825,590 | Sutherland | Mar. 4, 1958 |

FOREIGN PATENTS

| | | |
|---|---|---|
| 224,101 | Great Britain | Nov. 6, 1924 |